United States Patent
Min et al.

(10) Patent No.: US 7,292,302 B2
(45) Date of Patent: Nov. 6, 2007

(54) FRINGE FIELD SWITCHING LIQUID CRYSTAL DISPLAY AND METHOD FOR MANUFACTURING THE SAME

(75) Inventors: Tae Yop Min, Seoul (KR); Seung Jun Yi, Seoul (KR); Hee Gyu Lee, Kyoungki-do (KR)

(73) Assignee: Boe-Hydis Technology Co., Ltd., Kyoungki-do (KR)

( * ) Notice: Subject to any disclaimer, the term of this patent is extended or adjusted under 35 U.S.C. 154(b) by 0 days.

(21) Appl. No.: 10/340,411

(22) Filed: Jan. 10, 2003

(65) Prior Publication Data

US 2003/0098939 A1    May 29, 2003

Related U.S. Application Data

(63) Continuation of application No. 09/607,288, filed on Jun. 30, 2000, now abandoned.

(30) Foreign Application Priority Data

Jun. 30, 1999    (KR) .................................. 99-25681

(51) Int. Cl.
G02F 1/1343    (2006.01)
(52) U.S. Cl. ................... 349/141; 349/142; 349/39; 349/38
(58) Field of Classification Search ........ 349/141–142, 349/38–39, 144; 438/30
See application file for complete search history.

(56) References Cited

U.S. PATENT DOCUMENTS 3,649,117 A * 3/1972 Weigl ........................ 430/40

(Continued)

FOREIGN PATENT DOCUMENTS

JP        55138922        10/1980

(Continued)

*Primary Examiner*—Andrew Schechter
*Assistant Examiner*—Hoan C. Nguyen
(74) *Attorney, Agent, or Firm*—Ladas & Parry LLP (57) ABSTRACT

Disclosed are a fringe field switching liquid crystal display (FFS-LCD) and a method for manufacturing the same. The FFS-LCD comprises upper and lower substrates opposed to each other at a predetermined distance; a liquid crystal layer intervened between the upper and lower substrates and having a plurality of liquid crystal molecules; a gate bus line extending along a predetermined direction on an inner surface of the lower substrate; a data bus line disposed on the lower substrate in a manner such that the data bus line is crossed with the gate bus line, for defining an unit pixel; a gate insulating film intervened between the gate bus line and the data bus line; a thin film transistor located at a place where the gate bus line and the data bus line are crossed with each other; a counter electrode disposed in a space of the unit pixel of the lower substrate; a common signal line brought into contact with the counter electrode for applying a common signal to the counter electrode; a pixel electrode electrically connected with the thin film transistor and formed in a manner such that the pixel electrode is overlapped with the counter electrode, the pixel electrode cooperating with the counter electrode to form a fringe field; and a passivation film intervened between the counter electrode and the pixel electrode; wherein the common signal line being formed on the gate insulating film and made of the same material as the data bus line.

6 Claims, 4 Drawing Sheets

U.S. PATENT DOCUMENTS

| | | | |
|---|---|---|---|
| 4,376,228 A * | 3/1983 | Fan et al. | 136/255 |
| 4,542,960 A | 9/1985 | Yang | |
| 4,643,533 A | 2/1987 | Armitage | |
| 4,898,768 A * | 2/1990 | Randhawa | 428/216 |
| 5,309,264 A | 5/1994 | Lien et al. | |
| 5,569,565 A * | 10/1996 | Kawakami et al. | 430/1 |
| 5,576,862 A | 11/1996 | Sugiyama et al. | |
| 5,959,708 A | 9/1999 | Lee et al. | |
| 5,962,916 A * | 10/1999 | Nakanishi et al. | 257/640 |
| 6,094,250 A * | 7/2000 | Choi et al. | 349/141 |
| 6,118,508 A * | 9/2000 | Park | 349/141 |
| 6,140,158 A * | 10/2000 | Rhee et al. | 438/149 |
| 6,177,970 B1 * | 1/2001 | Kim | 349/43 |
| 6,233,034 B1 * | 5/2001 | Lee et al. | 349/141 |
| 6,281,953 B1 * | 8/2001 | Lee et al. | 349/43 |
| 6,319,760 B1 * | 11/2001 | Lee et al. | 438/161 |
| 6,449,026 B1 * | 9/2002 | Min et al. | 349/141 |
| 6,562,645 B2 * | 5/2003 | Sung et al. | 438/30 |
| 6,714,269 B1 * | 3/2004 | Huang | 349/54 |

FOREIGN PATENT DOCUMENTS

| | | | |
|---|---|---|---|
| JP | 57069281 | | 4/1982 |
| JP | 58083478 | | 5/1983 |
| JP | 60017419 | | 1/1985 |
| JP | 60222825 | | 11/1985 |
| JP | 02071616 | | 3/1990 |
| JP | 403278466 A | * | 12/1991 |
| JP | 11167120 | | 6/1999 |
| JP | 11282427 | | 10/1999 |
| JP | 200056284 | * | 2/2000 |

* cited by examiner

FRINGE FIELD SWITCHING LIQUID CRYSTAL DISPLAY AND METHOD FOR MANUFACTURING THE SAME

REFERENCE TO RELATED APPLICATIONS

This invention is a continuation of U.S. patent application Ser. No. 09/607,288, filed on Jun. 30, 2000 now abandoned.

BACKGROUND OF THE INVENTION

1. Field of the Invention

The present invention relates to a liquid crystal display (LCD) and a method for manufacturing the same, and more particularly, the present invention relates to a fringe field switching liquid crystal display (FFS-LCD) and a method for manufacturing the same.

2. Description of the Related Art

Generally, a fringe field switching liquid crystal display is developed so as to increase an aperture ratio and a transmittance of an in-plane switching liquid crystal display (IPS-LCD), as is described in U.S. patent application Ser. No. 09/379,031, now U.S. Pat. No. 6,281,953, issued on Aug. 28, 2001.

An FFS-LCD includes an upper substrate and a lower substrate which are separated from each other by a predetermined cell gap, a liquid crystal layer which is intervened between the upper and lower substrates, and a counter electrode and a pixel electrode which are formed on an inner surface of the lower substrate. Each of the counter electrode and the pixel electrode is made of a transparent conductive material, and a distance between the counter electrode and the pixel electrode is set to be smaller than the predetermined cell gap. According to this, a fringe field is formed between and over the electrodes.

Figure 1:
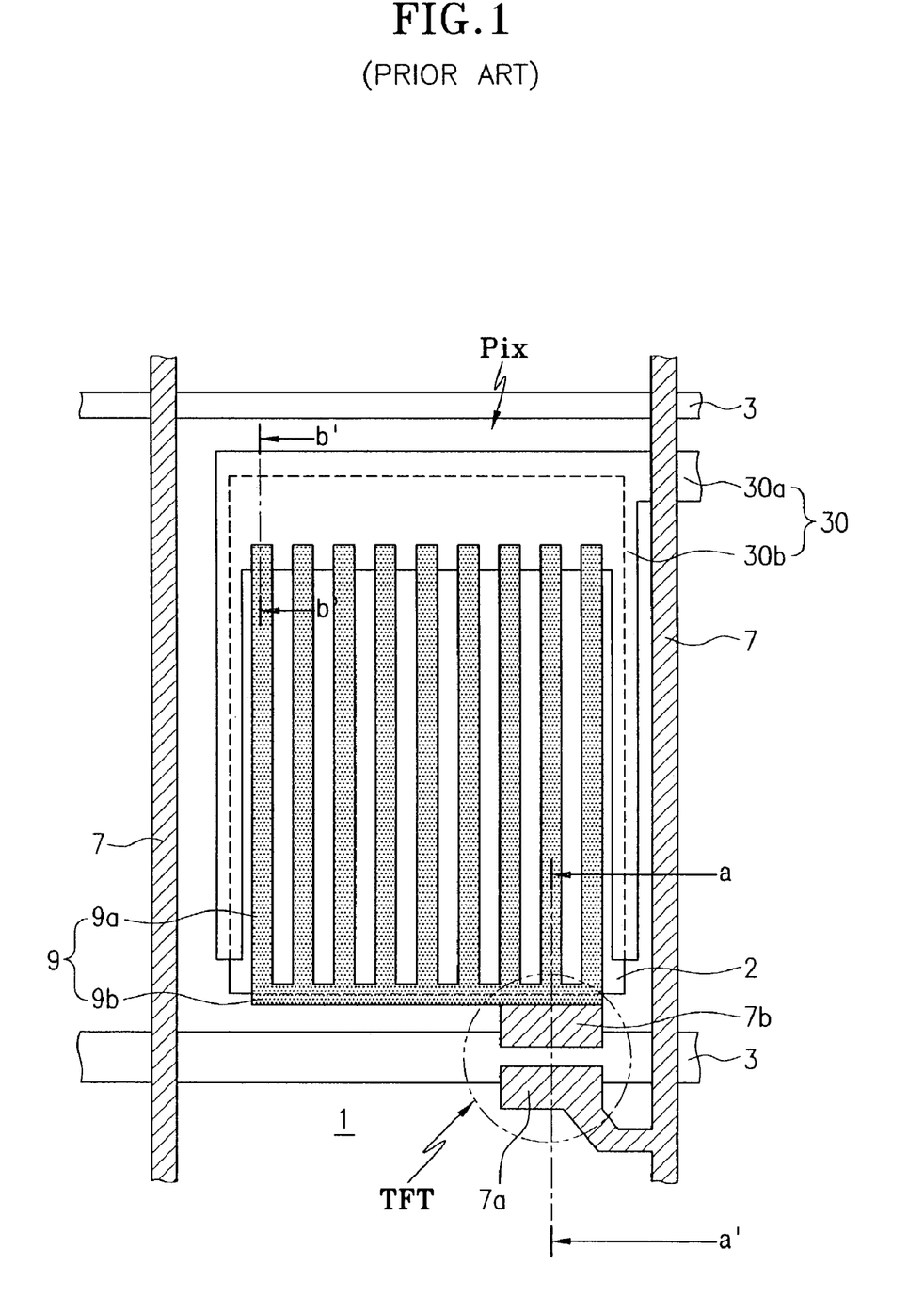
FIG. 1 is a plan view of a lower substrate of the conventional FFS-LCD.

FIG. 1 is a plan view of a lower substrate of the conventional FFS-LCD. Referring to FIG. 1, by the fact that a gate bus line 3 and a data bus line 7 are disposed on a lower substrate 1 in such a way as to be crossed with each other, a unit pixel is defined. A thin film transistor TFT is located at a place where the gate bus line 3 and the data bus line 7 are crossed with each other. A counter electrode 2 which is made from a transparent conductive material, is arranged for each unit pixel. At this time, the counter electrode 2 can be formed to have a rectangular plate-shaped or a comb-shaped contour. A common signal line 30 is disposed in a manner such that the common signal line 30 is brought into contact with the counter electrode 2 so as to continuously supply a common signal to the counter electrode 2. At this time, the common signal line 30 is formed of a metal film which has an excellent signal transmitting characteristic, and generally is formed of a metal film which is used for forming the gate bus line 3. The common signal line 30 includes a first section 30a which is parallel to the gate bus line 3 and is brought into contact with a predetermined portion of the counter electrode 2, and a second section 30b which extends from the first section 30a parallel to the data bus line 7 and is disposed between the counter electrode 2 and the data bus line 7. A pixel electrode 9 is formed in the unit pixel in a manner such that the pixel electrode 9 is overlapped with the counter electrode 2. At this time, the pixel electrode 9 and the counter electrode 2 are electrically insulated from each other. The pixel electrode 9 is formed to have a comb-shaped contour. The pixel electrode 9 includes comb teeth 9a which are spaced apart one from another by the same distance and parallel to the data bus line 7, and a bar section 9b which connects one ends of the comb teeth 9a and is brought into contact with a predetermined portion of the thin film transistor TFT. On the other hand, while not shown in the drawing, an upper electrode is opposed to the lower electrode 1 at a distance which is larger than a distance between the pixel electrode 9 and the counter electrode 2.

Figure 2A:
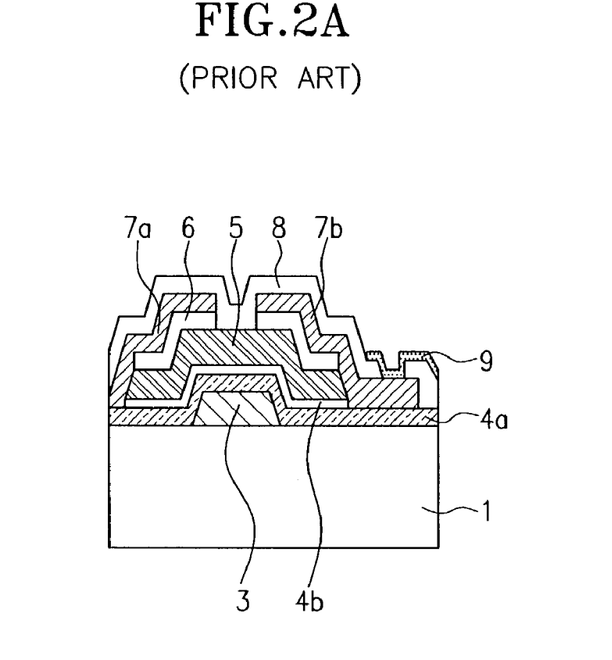
FIG. 2a is a cross-sectional view taken along the line a-a' of FIG. 1.

Hereinafter, a method for manufacturing the FFS-LCD constructed as mentioned above will be described. FIG. 2a is a cross-sectional view taken along the line a-a' of FIG. 1; and FIG. 2b is a cross-sectional view taken along the line b-b' of FIG. 1.

Figure 2B:
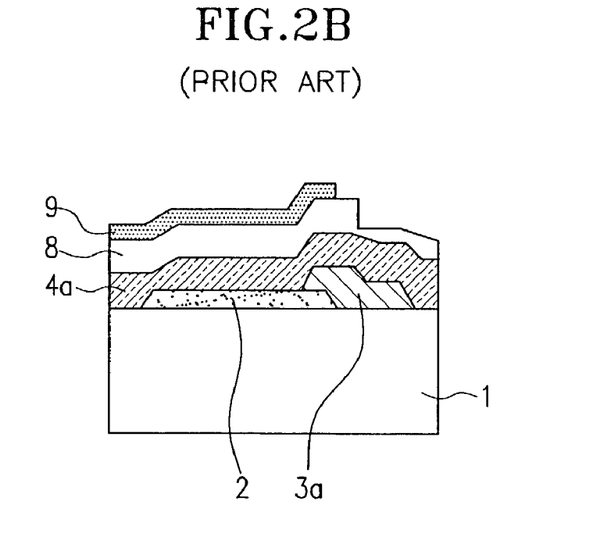
FIG. 2b is a cross-sectional view taken along the line b-b' of FIG. 1.

Referring to FIGS. 2a and 2b, after an indium tin oxide (ITO) layer is formed on the lower substrate 1, a predetermined portion of the ITO layer is patterned and thereby, the counter electrode 2 is formed. Then, after a metal film for the gate bus line, for example, a metal film made from MoW is formed on the lower substrate 1 on which the counter electrode 2 is formed, a preset portion of the metal film is patterned thereby to form the gate bus line 3 and the common electrode 30a. Thereupon, a first gate insulating film 4a made of a silicon oxynitride oxide film, a second gate insulating film 4b made of a silicon nitride film, an amorphous silicon layer and a doped semiconductor layer are sequentially deposited. Next, preselected portions of the doped semiconductor layer, the amorphous silicon layer and the second gate insulating film 4b are patterned to define a shape of an active region (a thin film transistor region). According to this, the doped semiconductor layer defines an ohmic contact layer 6, and the amorphous silicon layer defines a channel layer 5. Thereafter, a metal film for the data bus line is deposited on the lower substrate 1 on which the active region is defined, and a predetermined portion of this metal film is patterned, whereby a source electrode 7a, a drain electrode 7b, and the data bus line (not shown) are formed. Then, the ohmic contact layer 6 is patterned to define forms of the source and drain electrodes 7a and 7b, whereby the thin film transistor TFT is completed. After that, a passivation film 8 is formed on the lower substrate 1 on which the thin film transistor TFT is formed. The passivation film 8 is etched in a manner such that a predetermined portion of the drain electrode 7b is exposed. Following this, the pixel electrode 9 is formed on the passivation film 8 in a manner such that the pixel electrode 9 is brought into contact with the exposed drain electrode 7b.

The FFS-LCD manufactured as described above operates as stated below.

If an electric field is formed between the counter electrode 2 and the pixel electrode 9, because a distance between the counter electrode 2 and the pixel electrode 9 is smaller than a distance between the upper and lower substrates, a fringe field including a vertical component is developed between the upper and lower substrates. Since the fringe field influences over entire areas on the counter electrode 2 and the pixel electrode 9, all liquid crystal molecules existing on the electrodes 2 and 9 are activated. By this, it is possible to accomplish a high aperture ratio and a high transmittance.

However, the conventional FFS-LCD has disadvantages as given below.

First, due to the fact that the first gate insulating film 4a and the passivation film 8 are intervened between the counter electrode 2 and the pixel electrode 9, the thickness of the insulation layer between the counter electrode 2 and the pixel electrode 9 is decreased and the intensity of the electric field is reduced. As a result of this, an afterimage appears on the display and driving voltage is elevated.

The common signal line 30 is formed of the same material as the gate bus line 3 to define a storage-on-common type arrangement. At this time, while the gate bus line is mainly made from MoW, the MoW has a high resistance in comparison with an aluminum-based metal film. Consequently, in order to enable a common signal to be reliably transmitted, the common signal line 30 is formed to have relatively a large width. Nevertheless, due to the fact that the common signal line 30 is formed to have relatively a large width, an aperture ratio is reduced.

SUMMARY OF THE INVENTION

Accordingly, the present invention has been made in an effort to solve the problems occurring in the related art, and an object of the present invention is to provide a fringe field switching liquid crystal display which has a reduced distance between a counter electrode and a pixel electrode and an increased aperture ratio.

Another object of the present invention is to provide a method for manufacturing the fringe field switching liquid crystal display.

In order to achieve the first object, according to one aspect of the present invention, there is provided a fringe field switching liquid crystal display comprising: upper and lower substrates opposed to each other at a predetermined distance; a liquid crystal layer intervened between the upper and lower substrates and having a plurality of liquid crystal molecules; a gate bus line extending along a predetermined direction on an inner surface of the lower substrate; a data bus line disposed on the lower substrate in a manner such that the data bus line is crossed with the gate bus line, for defining an unit pixel; a gate insulating film intervened between the gate bus line and the data bus line; a thin film transistor located at a place where the gate bus line and the data bus line are crossed with each other; a counter electrode disposed in a space of the unit pixel of the lower substrate; a common signal line brought into contact with the counter electrode for applying a common signal to the counter electrode; a pixel electrode electrically connected with the thin film transistor and formed in a manner such that the pixel electrode is overlapped with the counter electrode, the pixel electrode cooperating with the counter electrode to form a fringe field; and a passivation film intervened between the counter electrode and the pixel electrode; wherein the common signal line being formed on the gate insulating film and made of the same material as the data bus line.

According to another aspect of the present invention, there is provided a fringe field switching liquid crystal display comprising: upper and lower substrates opposed to each other at a predetermined distance; a liquid crystal layer intervened between the upper and lower substrates and having a plurality of liquid crystal molecules; a gate bus line extending along a predetermined direction on an inner surface of the lower substrate; a data bus line disposed on the lower substrate in a manner such that the data bus line is crossed with the gate bus line, for defining an unit pixel; a gate insulating film intervened between the gate bus line and the data bus line; a thin film transistor located at a place where the gate bus line and the data bus line are crossed with each other; a counter electrode disposed in a space of the unit pixel of the lower substrate; a common signal line brought into contact with the counter electrode for applying a common signal to the counter electrode; a pixel electrode electrically connected with the thin film transistor and formed in a manner such that the pixel electrode is overlapped with the counter electrode, the pixel electrode cooperating with the counter electrode to form a fringe field; and a passivation film intervened between the counter electrode and the pixel electrode; wherein the common signal line being formed on the gate insulating film and extending between and parallel to two adjoining data bus lines, each of the common signal line and the data bus line being formed of a metal film including aluminum.

In order to achieve the second object, according to still another aspect of the present invention, there is provided a method for manufacturing a fringe field switching liquid crystal display, the method comprising the steps of: forming a gate bus line on a lower substrate; depositing sequentially first and second gate insulating films, an amorphous silicon layer and a doped semiconductor layer on the lower substrate; patterning predetermined portions of the doped semiconductor layer, the amorphous silicon layer and the second gate insulating film and thereby defining an active region including an ohmic contact layer and a channel layer; forming a counter electrode using a transparent conductive material, on the first gate insulating film at a side of the active region; depositing a metal film on the first gate insulating film on which the counter electrode is formed, patterning a predetermined portion of the metal film and thereby forming a data bus line, a source electrode, a drain electrode and a common signal line; depositing a passivation film on the resultant lower substrate; etching the passivation film in a manner such that the drain electrode is exposed; and forming a pixel electrode using a transparent conductive material, on the passivation layer, in a manner such that the pixel electrode is brought into contact with the exposed drain electrode, the pixel electrode cooperating with the counter electrode to form a fringe field.

According to yet still another aspect of the present invention, there is provided a method for manufacturing a fringe field switching liquid crystal display, the method comprising the steps of: forming a gate bus line on a lower substrate; depositing sequentially first and second gate insulating films, an amorphous silicon layer and a doped semiconductor layer on the lower substrate; patterning predetermined portions of the doped semiconductor layer, the amorphous silicon layer and the second gate insulating film and thereby defining an active region including an ohmic contact layer and a channel layer; forming a counter electrode using a transparent conductive material, on the first gate insulating film at a side of the active region; depositing a metal film on the first gate insulating film on which the counter electrode is formed, patterning a predetermined portion of the metal film and thereby forming a data bus line, a source electrode, a drain electrode and a common signal line; depositing a passivation film on the resultant lower substrate; etching the passivation film in a manner such that the drain electrode is exposed; and forming a pixel electrode using a transparent conductive material, on the passivation layer, in a manner such that the pixel electrode is brought into contact with the exposed drain electrode, the pixel electrode cooperating with the counter electrode to form a fringe field; each of the data bus line, the source electrode, the drain electrode and the common signal line is formed of a metal film which is made from Mo/Al/Mo or Mo/AlNd/Mo.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF PREFERRED EMBODIMENTS

Reference will now be made in greater detail to a preferred embodiment of the invention, an example of which is illustrated in the accompanying drawings. Wherever possible, the same reference numerals will be used throughout the drawings and the description to refer to the same or like parts.

Figure 3:
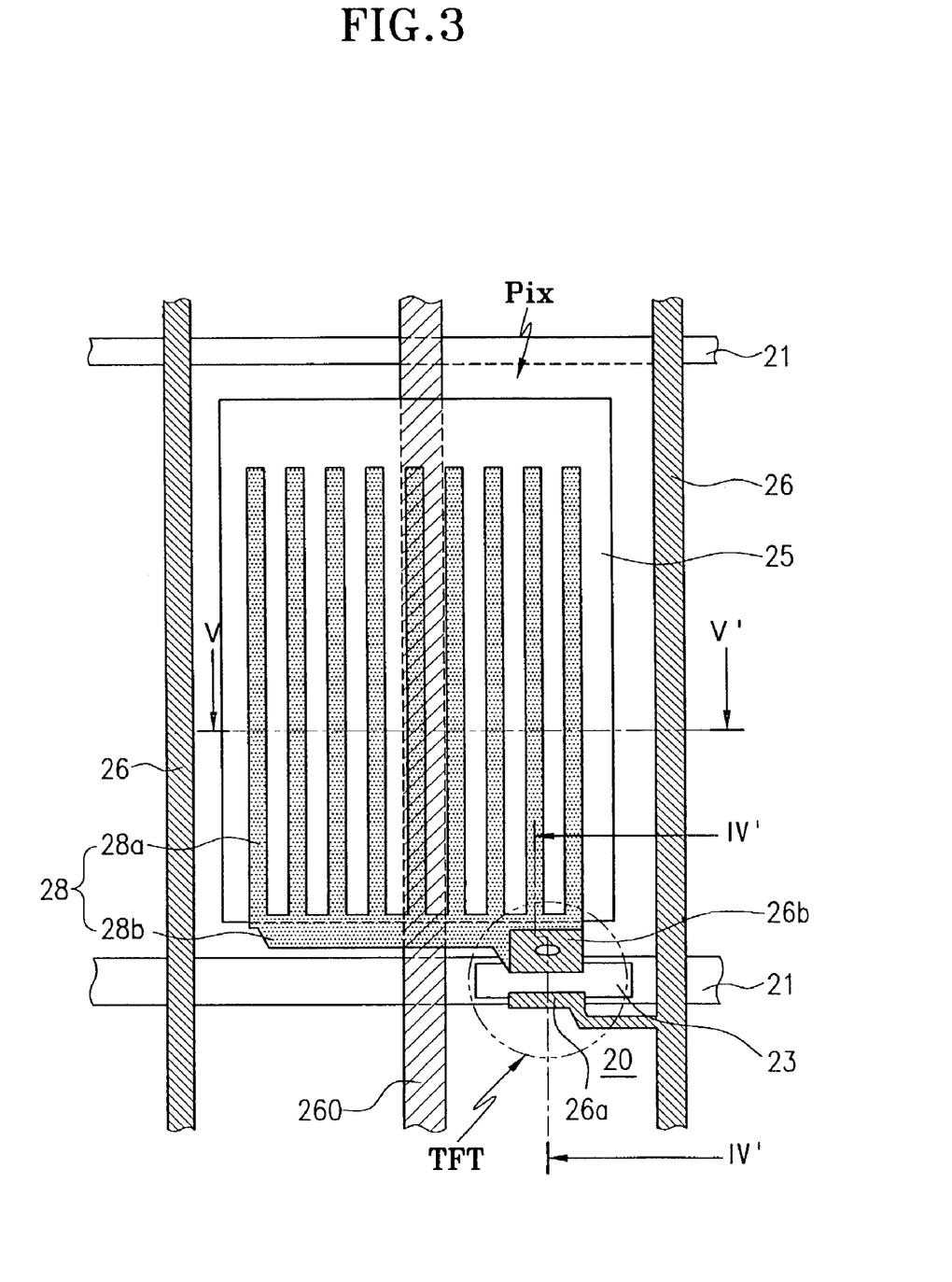
FIG. 3 is a plan view of a liquid crystal display having high aperture ratio and transmittance, in accordance with an embodiment of the present invention.

First, referring to FIG. 3, a gate bus line 21 extends in an x direction on a plane of FIG. 3, and a data bus line 26 extends in a y direction which is perpendicular to the x direction, whereby a unit pixel which has a rectangular contour, is delimited. At this time, the gate bus line 21 is formed of a metal film such as being made from MoW, and the data bus line 26 is formed of a metal film including aluminum having an excellent conductivity characteristic, such as a metal film made from Mo/Al/Mo or Mo/AlNd/Mo. Here, because the gate bus line 21 is formed at an initial step of an LCD forming process, the gate bus line 21 should be made from a material which is less susceptible to a temperature generated in subsequent processes. Therefore, a material which has a sufficient heat resistance, is adopted for forming a metal film for the gate bus line. On the other hand, as the data bus line 26 is formed at a final step of the LCD forming process, the data bus line 26 is hardly influenced at all by temperature. Hence, a metal film including aluminum which has an excellent conductivity characteristic can be adopted for forming the data bus line 26. A thin film transistor TFT is located at a place where the gate bus line 21 and the data bus line 26 are crossed with each other. Here, as well known in the art, the gate bus line 21 and the data bus line 26 are insulated from each other by a gate insulating film (not shown). A counter electrode 25 is formed in the unit pixel, using a transparent conductive material, for example, an ITO layer. The counter electrode 25 can be formed to have a plate-shaped or a comb-shaped contour. In the present embodiment, the counter electrode 25 is formed to have the plate-shaped contour.

Figure 5:
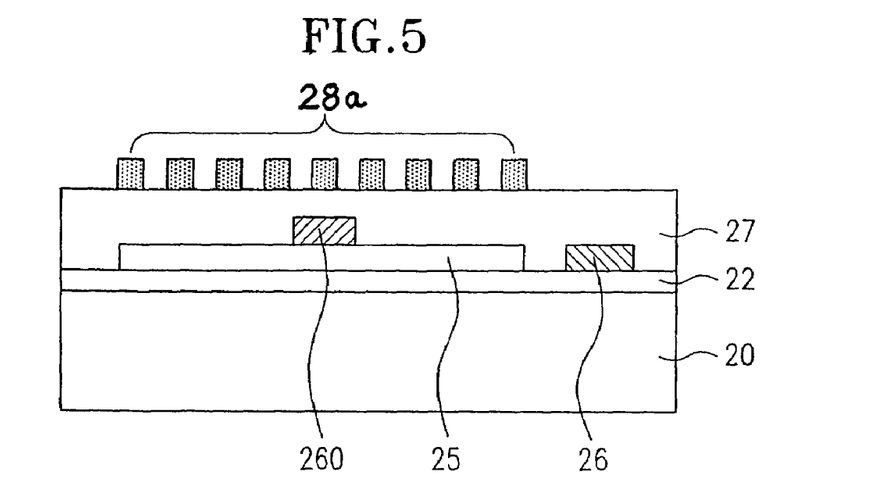
FIG. 5 is a cross-sectional view taken along the line V-V' of FIG. 3.

As is shown in cross-section in FIG. 5, a common signal line 260 is formed on the counter electrode 25 in a manner such that the common signal line 260 is brought into contact with the counter electrode 25. At this time, it is preferred that the common signal line 260 be formed between two adjoining data bus lines 26 in such a way as to be parallel to the data bus lines 26 and be formed of the same material as the metal film for the data bus line. As a consequence, by the fact that the common signal line 260 is formed of the same material as the data bus lines 26, the conductivity is markedly improved in comparison with the conventional common signal line, which is formed of the same material as the gate bus line. According to this, since a line width of the common signal line 260 can be reduced, the area which is occupied by the common signal line 260 in the unit pixel, can be reduced. Hence, the aperture ratio is increased. Also, because the common signal line 260 is formed at the same distance from the data bus line 26 and parallel to the data bus line 26, it is possible to prevent a short from occurring between the common signal line 260 and the data bus line 26.

A pixel electrode 28 is formed on the counter electrode 25 using a transparent conductive material, for example, an ITO material, in a manner such that the pixel electrode 28 is overlapped with the counter electrode 25. The pixel electrode 28 is formed to have the comb-shaped contour. More particularly, the pixel electrode 28 includes comb teeth 28a which extend parallel to the data bus line 26, and a bar section 28b which connects one ends of the comb teeth 28a and is brought into contact with the thin film transistor TFT. At this time, the pixel electrode 28 is located over the common signal line 260. Gate insulating films are intervened between the counter electrode 25 and the pixel electrode 28 and between the common signal line 260 and the pixel electrode 28, respectively, whereby the counter electrode 25 and the pixel electrode 28 are insulated from each other and the common signal line 260 and the pixel electrode 28 are insulated from each other. In the present embodiment, each of the counter electrode 25 and the pixel electrode 28 must be formed of a transparent conductive material in a manner such that a fringe field is formed between the counter electrode 25 and the pixel electrode 28, and a distance between the counter electrode 25 and the comb teeth 28a of the pixel electrode 28 should be smaller than a cell gap between the upper and lower substrates. Further, a line width of the counter electrode 25 which is exposed between comb teeth 28a of the pixel electrode 28, must be determined so that liquid crystal molecules existing on the comb teeth 28a of the pixel electrode 28 and on the counter electrode 25 can be activated by the fringe field.

Hereinafter, a method for manufacturing the FFS-LCD according to the present invention, constructed as mentioned above, will be described in detail.

Figure 4:
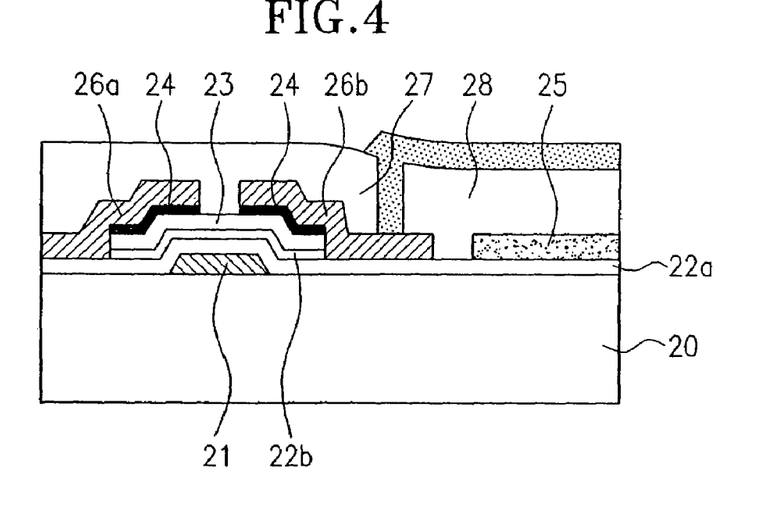
FIG. 4 is a cross-sectional view taken along the line IV-IV' of FIG. 3.

Referring to FIGS. 3 and 4, after the metal film for the gate bus line, for example, the metal film made from MoW, is deposited on the lower substrate 20, a predetermined portion of the metal film for the gate bus line is patterned, whereby the gate bus line 21 is formed. Thereafter, a first gate insulating film 22a which is made from a silicon oxynitride oxide (SiON) film, a second gate insulating film 22b which is made from a silicon nitride (SiN), an amorphous silicon layer and a doped semiconductor layer are sequentially deposited. Then, predetermined portions of the doped semiconductor layer, the amorphous silicon layer and the second insulating film 22b are patterned to the shape of an active region (a thin film transistor region), whereby an ohmic layer 24 and a channel layer 23 are defined. Thereupon, after a first ITO film is formed on the active region and the first gate insulating film 22a, a preselected portion of the first ITO film is patterned in a manner such that the first ITO film exists sideward of the active region, whereby the counter electrode 25 is formed. At this time, as described above, the counter electrode 25 is formed to have the plate-shaped contour. Then, after the metal film including aluminum which has a high conductivity, for example, the metal film made from Mo/Al/Mo or Mo/AlNd/Mo, is deposited on the lower substrate 20 on which the counter electrode 25 is formed, a preset portion of the metal film is patterned, whereby a source electrode 26a and a drain electrode 26b are formed at both sides of the active region and at the same time, the data bus line 26 is formed in a manner such that the data bus line 26 is crossed with the gate bus line 21.

Moreover, at the same time when the data bus line 26 is formed, the common signal line 260 is formed on the counter electrode 25 in a manner such that the common signal line 260 is brought into contact with the counter electrode 25. Thereafter, a passivation film 27 is deposited on the resultant lower substrate 20. Next, a predetermined portion of the passivation film 27 is etched so that the drain electrode 26b of the thin film transistor TFT is exposed. Then, a second ITO layer is deposited on the passivation film 27 in a manner such that the second ITO layer is brought into contact with the exposed drain electrode 26b. Following this, the second ITO film is patterned so that the second ITO layer is overlapped with the counter electrode 25, whereby the pixel electrode 28 is formed.

As described above, according to the present invention, advantages are provided in that, since a passivation film is intervened between a counter electrode and a pixel electrode, the thickness of the insulation layer between the counter electrode and the pixel electrode is reduced by a thickness of a first gate insulating film. As a consequence, the electric field path between the counter electrode and the pixel electrode and the electric field path between the pixel electrode and the counter electrode are made identical to each other, whereby an afterimage does not appear on a display. Furthermore, auxiliary capacitance is increased and the intensity of the electric field is enhanced, whereby power consumption can be reduced.

Moreover, because a common signal line is formed of the same material as a data bus line having a conductivity which is superior to that of a gate bus line, it is possible to reduce a line width of the common signal line in comparison with the conventional common signal line, whereby an aperture ratio is improved.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method for manufacturing a fringe field switching liquid crystal display (FFS-LCD), the method comprising the steps of:
    forming a pair of gate bus lines on a lower substrate;
    depositing sequentially first and second gate insulating films, an amorphous silicon layer and a doped semiconductor layer on the lower substrate;
    patterning predetermined portions of the doped semiconductor layer, the amorphous silicon layer and the second gate insulating film and thereby defining an active region including an ohmic contact layer and a channel layer;
    forming a planar counter electrode using a transparent conductive material, on the first gate insulating film at a side of the active region;
    depositing a metal film on the first and second gate insulating films and the counter electrode, patterning a predetermined portion of the metal film and thereby forming a data bus line, a source electrode, a drain electrode and a common signal line,
        wherein the common signal line is disposed on the counter electrode with running in parallel with the data bus line such that the common signal line and the counter electrode are directly contacted to each other;
        wherein the gate bus line pair is laid substantially perpendicular to the data bus line and the area formed by the intersection is referred to as a unit pixel,
        wherein the common signal line is formed on the planar counter electrode inside the unit pixel and runs in parallel with a data bus line,
        wherein the common signal line is formed on the planar counter electrode and runs in parallel with and in between two data bus lines,
    depositing a passivation film on the resultant lower substrate;
    etching the passivation film in a manner such that the drain electrode is exposed; and
    forming a plurality of pixel electrodes in the unit pixel using a transparent conductive material, on the passivation layer, in a manner such that the pixel electrode is brought into contact with the exposed drain electrode, the pixel electrode cooperating with the counter electrode to form a fringe field,
        wherein the pixel electrode and the counter electrode are on a different layer separated by the passivation layer,
        wherein a distance between the counter electrode and the pixel electrode is set to be smaller than the predetermined cell gap according to FFS-LCD design principles.

2. The method as claimed in claim 1, wherein each of the data bus line, the source electrode, the drain electrode and the common signal line is formed of a metal film including aluminum.

3. The method as claimed in claim 2, wherein the metal film including aluminum is made from Mo/Al/Mo or Mo/AlNd/Mo.

4. The method as claimed in claim 1, wherein the first gate insulating film is formed of a silicon oxynitride layer and the second gate insulating film is formed of a silicon nitride layer.

5. A method for manufacturing a fringe field switching liquid crystal display (FFS-mode LCD), the method comprising the steps of:
    forming a pair of gate bus lines on a lower substrate;
    depositing sequentially first and second gate insulating films, an amorphous silicon layer and a doped semiconductor layer on the lower substrate;
    patterning predetermined portions of the doped semiconductor layer, the amorphous silicon layer and the second gate insulating film and thereby defining an active region including an ohmic contact layer and a channel layer;
    forming a planar counter electrode using a transparent conductive material, on the first gate insulating film at a side of the active region;
    depositing a metal film on the first and second gate insulating films and the counter electrode, patterning a predetermined portion of the metal film and thereby forming a data bus line, a source electrode, a drain electrode and a common signal line,
        wherein the common signal line is disposed on the counter electrode with running in parallel with the data bus line such that the common signal line and the counter electrode are directly contacted to each other;

wherein the gate bus line pair is laid substantially perpendicular to the data bus line and the area formed by the intersection is referred to as a unit pixel, wherein the common signal line is formed on the planar counter electrode inside the unit pixel and runs in parallel with a data bus line, depositing a passivation film on the resultant lower substrate;

etching the passivation film in a manner such that the drain electrode is exposed; and forming a plurality of pixel electrodes in the unit pixel using a transparent conductive material, on the passivation layer, in a manner such that the pixel electrode is brought into contact with the exposed drain electrode, the pixel electrode cooperating with the counter electrode to define a fringe field;

wherein each of the data bus line, the source electrode, the drain electrode and the common signal line is formed of a metal film which is made from Mo/Al/Mo or Mo/AlNd/Mo, wherein the pixel electrode and the counter electrode are on a different layer separated by the passivation layer, wherein a distance between the counter electrode and the pixel electrode is set to be smaller than the predetermined cell gap according to FFS-LCD design principles.

6. The method as claimed in claim 5, wherein the first gate insulating film is formed of a silicon oxynitride layer and the second gate insulating film is formed of a silicon nitride layer.

* * * * *